United States Patent [19]

Stamboulian

[11] Patent Number: 4,492,349
[45] Date of Patent: Jan. 8, 1985

[54] PROGRAMMED PAWL CONTROL MEANS

[75] Inventor: Nazareth Stamboulian, Los Angeles, Calif.

[73] Assignee: American Safety Equipment Corporation, Troy, Mich.

[21] Appl. No.: 299,940

[22] Filed: Sep. 8, 1981

[51] Int. Cl.³ .................. A62B 35/02; B65H 75/48
[52] U.S. Cl. ........................................ 242/107.4 A
[58] Field of Search ............... 242/107.4 R–107.4 E; 280/806; 297/478

[56] References Cited

U.S. PATENT DOCUMENTS

| Re. 29,594 | 3/1978 | Takada et al. | 242/107.4 B |
|---|---|---|---|
| 3,288,254 | 11/1966 | Replogle | 242/107.4 D |
| 3,430,891 | 3/1969 | Burleigh | 242/107.4 A |
| 3,578,260 | 5/1971 | Kell | 242/107.4 A |
| 3,741,496 | 6/1973 | Beller | 242/107.4 A |
| 3,838,832 | 10/1974 | Romanzi et al. | 242/107.4 A |
| 3,907,227 | 9/1975 | Takada et al. | 242/107.4 B |
| 3,913,860 | 10/1975 | Takada | 242/107.4 R |
| 3,991,953 | 11/1976 | Takada et al. | 242/107.4 A |
| 4,162,773 | 7/1979 | Wallin | 242/107.4 A |
| 4,337,906 | 7/1982 | Colasanti | 242/107.4 A |
| 4,371,128 | 2/1983 | Tanaka | 242/107.4 A |

Primary Examiner—John M. Jillions
Attorney, Agent, or Firm—Poms, Smith, Lande & Rose

[57] ABSTRACT

An automatically locking safety belt retractor has a belt storage spool with side mounted ratchet wheels, a locking bar pivotally mounted in the retractor side walls with pawl teeth for engaging the ratchet wheels, a programming ratchet wheel mounted to turn with the spool, a programming pawl and associated vehicle inertia sensor means mounted on the locking bar to cause the programming pawl to engage the programming ratchet wheel in response to actuation of the sensor means, the programming pawl movement imparted by the programming ratchet lifting the locking bar into engagement with the spool ratchet wheels and control means for preventing movement of the programming pawl when the webbing is not protracted to a position of use, the exemplary control means including a webbing sensor arm formed integrally of the programming pawl and shaped to engage webbing build up on the spool inwardly of the spool side ratchet wheel while the programming pawl engages a programming ratchet outwardly of the spool ratchet wheel.

6 Claims, 5 Drawing Figures

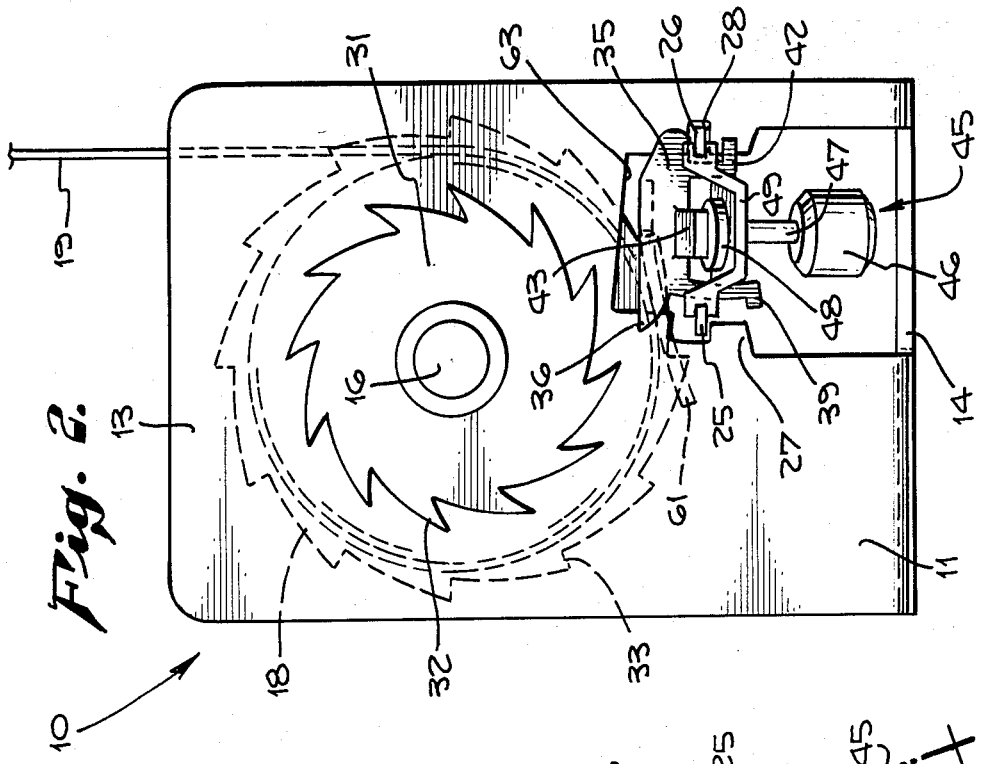
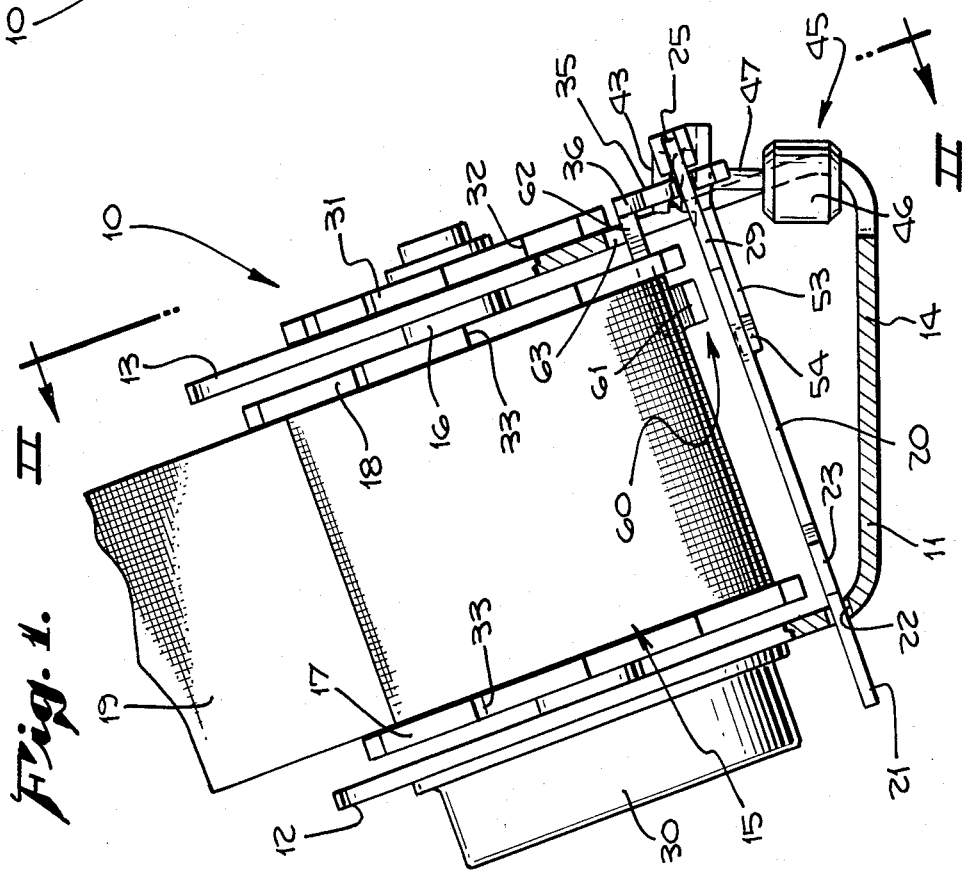

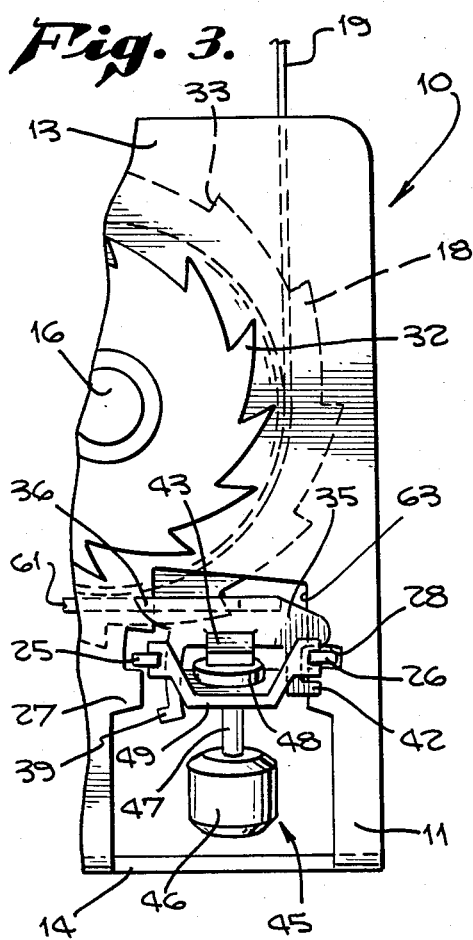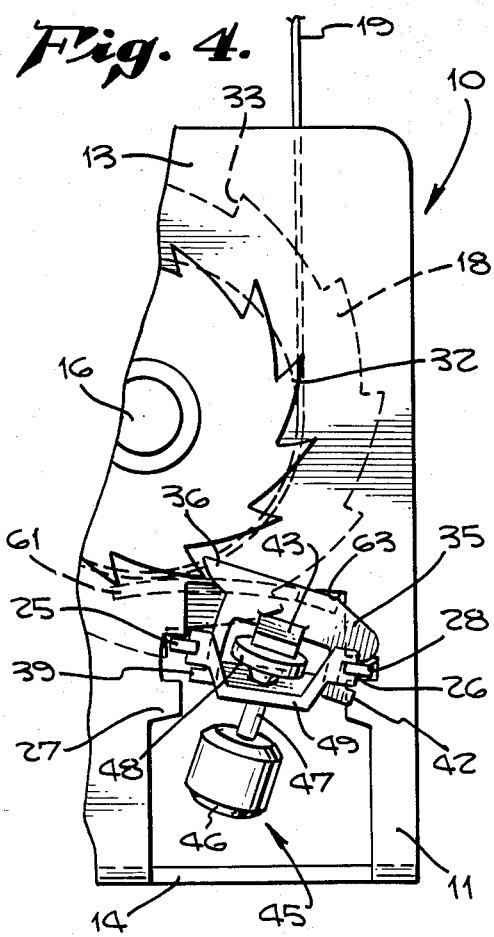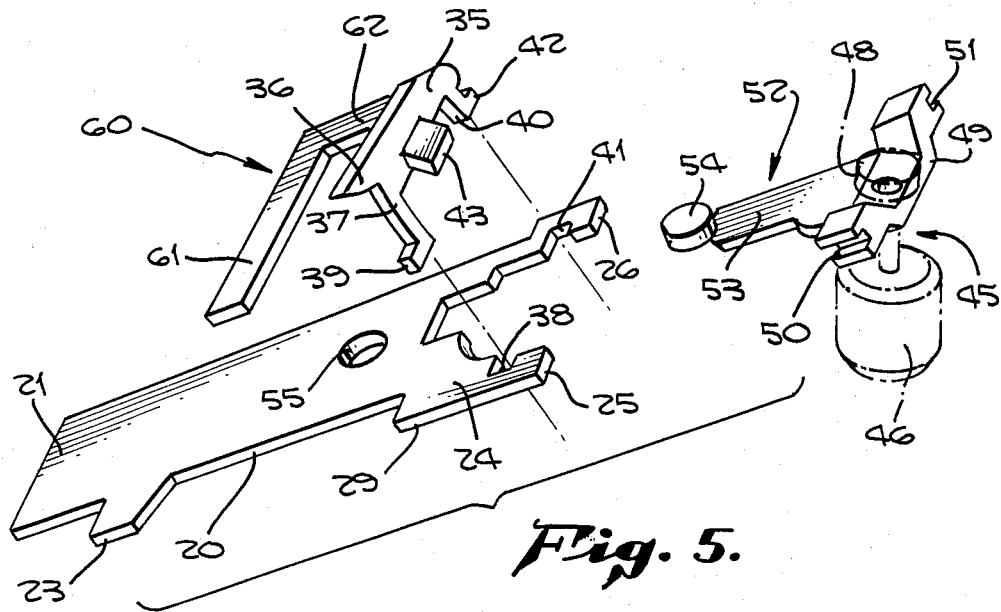

PROGRAMMED PAWL CONTROL MEANS

BACKGROUND OF THE INVENTION

This invention relates in general to automatically locking safety belt retractors of the type having a programmed pawl engagement, and more specifically, to a means for controlling the operation of a programming pawl employed in such retractors.

Emergency locking safety belt retractors are currently in wide use in automotive vehicles for storing safety belt webbing when not in use, and for restraining passengers in their seats by locking safety harness associated webbing wound on the retractor against protraction therefrom when a vehicle emergency condition is experienced. Typically, a vehicle inertia sensor means is employed to sense the emergency condition and to actuate a locking bar or pawl which engages with ratchet wheels provided on sides of the belt storage spool to prevent further belt protraction of the spool. The movement of the locking bar or pawl, into engagement with the spool associated ratchet wheels has been controlled by programming means which include a plastic programming ratchet mounted to the spool or spool axle and a programming pawl adapted to be actuated by the sensor means to engage the programming ratchet and be moved by rotation of the programming ratchet due to spool rotation whereby the programming pawl engages and lifts the locking bar or pawl into a metal-to-metal engagement with the spool ratchet wheels. Exemplary of such a safety belt retractor apparatus is that of the copending prior application Ser. No. 193,958 filed Oct. 6, 1980 now U.S. Pat. No. 4,371,128 and entitled "SEAT BELT RETRACTOR ASSEMBLY WITH PAWL MOUNTED PENDULUM".

It is the primary object of the present invention to disclose and provide a control means for a programming pawl of the type disclosed in said application Ser. No. 193,958 while will prevent operation of the spool locking means when the same is not required as when the safety belt is fully wound up on the retractor and is thus not in use. More specifically, it is an object of the present invention to disclose and provide a control means for controlling movement of the programming pawl relative to the programming ratchet under influence of the associated inertia sensor wherein the control means is simply and economically incorporated into the programming pawl and ratchet construction, where the assembly of such control means is automatically effected upon assembly of the programming pawl to the retractor apparatus and wherein the programming pawl operation is correlated to the position or condition of use of the spool, such positions or conditions corresponding to when the belt is not in use and belt webbing is fully wound up on the spool, when belt webbing is being protracted from the spool and when the webbing has been protracted enough to allow the associated safety belt or harness to be placed in a position of use.

SUMMARY OF THE INVENTION

Generally stated, the present invention in a programmed pawl control means finds particular use in an automatically locking safety belt retractor for restraining passengers in their seats in a vehicle wherein the retractor includes a belt storage spool with one or more side ratchet wheels, a locking bar with one or more pawl teeth for engaging with the one or more ratchet wheels of the spool to prevent spool rotation thereafter, programming means including a programming ratchet turning with the spool and a programming pawl adapted to move the locking bar into engagement with the spool ratchets in response to actuation by an associated emergency sensor means and includes the provision of control means for preventing movement of the programming pawl in a direction causing engagement between the locking bar and spool ratchets when the retractor spool is in a belt wound up position and during initial stages of belt protraction while belt webbing is being unwound from the spool to a position of use. More specifically, the present invention in programmed pawl control means includes the provision of a unitary light weight plastic pawl member of planar configuration having an integrally formed laterally extending sensor arm including a first extension arm portion extending extending normal to the plane of the programming pawl and a second sensor arm portion extending at right angles to the laterally extending arm portion whereby the sensor arm is positioned parallel to and laterally spaced from the planar programming pawl whereby the programming pawl and sensor arm unit may be readily mounted to the locking bar in association with a bar mounted inertia sensor means with the programming pawl portion of the unitary member positioned outwardly of the spool ratchet wheels to engage an outwardly mounted programming ratchet with the sensor arm portion of the unitary member positioned inwardly of the spool ratchet wheels in position to engage webbing wound up on the spool, the amount of webbing build up on the spool thereby controlling the range of movement allowed the programming pawl.

It is believed that a better understanding of the present invention in programmed pawl control means, as well as a recognition of various advantages and additional objects, will be afforded to those skilled in the art from a consideration of the following detailed description of an exemplary embodiment thereof. Reference will be made to the appended sheets of drawings which will first be described briefly.

BRIEF DESCRIPTION OF THE DRAWINGS

FIG. 1 is an elevational view of an exemplary automatic locking safety belt retractor in which the present improvement in control means for a programming pawl finds particularly suitable use;

FIG. 2 is a side view of the apparatus of FIG. 1 taken thereon along the plane II—II, showing the control means sensor arm engaging webbing fully stored on the retractor spool;

FIG. 3 is a view as in FIG. 2 showing the webbing being protracted to a position of use and the consequent positioning of the control means sensor arm;

FIG. 4 is a view as in FIGS. 2 and 3 showing the safety belt protracted to a position of use and the actuation of the programming pawl in response to actuation of the exemplary vehicle inertia sensor means; and FIG. 5 is an exploded detail view of the exemplary control means for programming pawl in accordance with the present invention shown in association with the retractor locking bar and means for mounting the unitary programming pawl and web sensor arm member to the locking bar.

DETAILED DESCRIPTION OF AN EXEMPLARY EMBODIMENT

Referring initially to FIGS. 1 and 2, an exemplary embodiment of emergency locking safety belt retractor is illustrated generally at 10. The exemplary retractor is of conventional construction in having a generally U-shaped frame 11 having side walls 12 and 13 upstanding from base 14. A conventional belt storage spool 15 is mounted by its spool shaft 16 in the frame side walls with spool mounted ratchet wheels 17 and 18 positioned on opposite sides of the webbing 19 rolled up on the spool.

A conventional locking bar 20 is pivotally mounted in the retractor side walls with the bar left end 21 fitted within side wall slot 22 to place the locking bar tooth 23 in alignment with ratchet wheel 17. The right hand end 24 (in FIG. 5) of the locking bar 20 has extremities 25 and 26, as best seen in the exploded view of FIG. 5, for riding in the retractor side wall 13. As seen in FIG. 2, side wall 13 has a tab 27 underlying bar extremity 25 and a slot 28 into which bar end extremity 26 pivotally sits. Right hand tooth portion 24 is thus aligned to engage with the right hand spool ratchet wheel 18 as seen in FIG. 1. The spool, indicated generally at 15, is normally biased to a wound up condition with the webbing 19 rolled up thereon, as seen in FIGS. 1 and 2, under the urging of a conventional retractor spring provided in spring housing 30.

As is also known heretofore, the actuation of the locking bar 20 may be programmed through the use of a programming ratchet, as programming ratchet 31 mounted on spool shaft 16, and a programming pawl operated by inertia sensor means, as programming pawl 35 in the exemplary embodiment. As seen in FIG. 2, the programming ratchet wheel 31 has a plurality of programming teeth 32 which are aligned, and equal in number, to the teeth 33 on the spool ratchet wheel. The programming pawl 35, in turn, has a tooth 36 adapted to mate with programming ratchet wheel teeth 32 when moved into engagement therewith, as seen in FIG. 4. The exemplary programming pawl is mounted to the locking bar 20 to raise it in response to actuation of the vehicle inertia sensor, indicated generally at 45, as will now be described.

As can be seen in FIGS. 2 and 5, the exemplary programming pawl 35 has a front leg 37 adapted to fit in slot 38 of the locking bar with a foot 39 underlying portions of the lock bar adjacent slot 38. A rear leg 40 of pawl 35 fits in slot 41 in the locking bar with a rear leg foot 42 closely underlying adjacent portions of the lock bar. An actuator arm 43 extends laterally for engagement by the inertia sensor as described subsequently. The programming pawl 35 is thus adapted to pivot on its rear leg connection to slot 41 of the lock bar with its tooth 36 having an initial free range of movement relative the lock bar until its front leg foot 39 comes up under lock bar 20 as the programming ratchet draws the programming pawl upwardly as seen in FIG. 4.

Actuation of the exemplary programming pawl 35 is accomplished by a conventional vehicle inertia sensor indicated generally at 45. Such sensor, in the exemplary embodiment, includes a mass 46 suspended by stem 47 from head 48, the thus provided pendulum member being supported by head 48 from support 49. Support 49 has an appropriate aperture receiving stem 47 freely therethrough with support end slots 50 and 51 mounting the support on inner sides of locking bar extremities 25 and 26. The safety belt retractor construction thus far described is in accordance with the disclosure of the copending prior application Ser. No. 193,958 filed Oct. 6, 1980 entitled SEAT BELT RETRACTOR ASSEMBLY WITH PAWL MOUNTED PENDULUM which is assigned to the common assignee of this application. The description of the retractor apparatus of that application is incorporated herein by reference, the within description having been made for purposes of showing an exemplary environment in which the present invention in control means for a programming pawl finds particularly suitable use.

As is particularly contemplated within the present invention, control means are provided for controlling movement of the programming pawl 35 in order to prevent premature or inadvertent lock up of the safety belt retractor. In the exemplary embodiment, such programming pawl control means is indicated generally at 60 and includes a webbing sensor arm 61 which is parallel to and laterally offset from the planar body of pawl 35 by laterally extending support arm 62. Arm 62 is substantially normal to the plane of pawl 35 which is also the plane of movement for pawl 35 into engagement with the teeth 32 of programming ratchet wheel 31, as seen in FIG. 1. Sensor arm 61 is perpendicular to arm 62, by being formed integrally thereof and at right angles thereto, to be placed parallel to and spaced from pawl 35 for reasons as discussed hereinafter.

As seen in FIG. 1, sensor arm 61 is positioned inwardly, relative the spool 15, of ratchet wheel 18 while the pawl 35 is positioned outwardly of both the ratchet wheel 18 and retractor side wall 13 to be in position to engage the programming ratchet 31. The laterally extending, interconnecting arms 62 extends through the large aperture 63 in the retractor side wall and beneath the ratchet wheel 18 into the area between spool ratchet wheels 17 and 18 to mount sensor arm 61 in position to engage webbing build up as the safety belt is wound onto and off of the retractor. As is particularly contemplated within the present invention, the sensor arm 61 laterally extending arm 62 and programming pawl 35 are formed integrally of a light weight plastic material to function as a unitary member which can be readily mounted to the locking bar 20 in association with a vehicle inertia sensor means, as indicated generally at 45, so that on assembly of the programming pawl, sensor means and locking bar to the retractor, the programming pawl control is automatically positioned in operable relation to the retractor component by which it is actuated, which is the build up of the webbing in the exemplary embodiment.

Having thus described an exemplary embodiment of control means for programming pawl in accordance with the present invention, it should be apparent to those skilled in the art that various additional objects and advantages have been attained by the within invention and that various modifications, adaptations and alternative embodiments may be made within the scope of the present invention which is defined by the following claims.

I claim:

1. In an automatically locking safety belt retractor for use with safety harnesses employed for restraining passengers in their seat in vehicles wherein the retractor includes a belt storage spool rotatably mounted by a spool axle in a retractor frame, one or more ratchet wheels mounted on said axle, a locking bar with one or more pawl teeth for engaging said one or more ratchet wheels to lock said axle and spool against belt protraction movement, programming means for operating said locking bar into engagement with said one or more ratchet wheels and including a programming ratchet mounted to turn with said spool and a programming pawl, and vehicle inertia sensor means for actuating said programming pawl into engagement with said programming ratchet in response to changes in vehicle inertia of more than a predetermined amount, the improvement comprising the provision of:

control means for preventing movement of said programming pawl under the influence of said vehicle inertia sensor means when said belt is fully wound on said spool.

2. The improvement in automatic locking safety belt retractor of claim 1 wherein said control means is provided so as to prevent engagement between said programming pawl and said programming ratchet wheel during initial stages of protraction of said belt from said spool toward a position of use.

3. The improvement in automatic locking safety belt retractor of claim 1 wherein said control means comprises:

a web sensor arm integrally formed with said programming pawl, said sensor arm including a laterally extending arm portion and a web sensing arm portion, said arm portions being at right angles to one another to place said web sensing arm portion laterally spaced and generally parallel to said programming pawl.

4. In an automatically locking safety belt retractor of the type having a vehicle inertia sensor means, a locking pawl, a webbing storage retractor spool with an associated ratchet means, the sensor means being mounted on the locking pawl, and a programming ratchet means associated with the retractor spool, the improvement comprising the provision of:

a unitary programming pawl and pawl control means for engaging said programming ratchet means to operate said locking pawl into engagement with said ratchet means in response to actuation by said vehicle inertia sensor means only when said safety belt webbing is in a protracted position relative said retractor.

5. The improvement in automatic locking safety belt retractor of claim 4 wherein:

said unitary programming pawl and control means includes a light weight plastic pawl having an integrally formed laterally extending sensor arm for engaging webbing build up on said spool; and means are provided for mounting said unitary programming pawl and control means directly upon said locking pawl in association with said vehicle inertia sensor means and with said integrally formed laterally extending sensor arm positioned between the ratchet wheels of said retractor spool in position to engage the safety belt webbing as it is wound onto and off of said spool.

6. The improvement in automatic locking safety belt retractor of claim 5 wherein said integrally formed laterally extending sensor arm has a first arm portion extending normal to a plane in which said programming pawl moves into engagement with said programming ratchet means and a second sensor arm portion at right angles to said first arm portion and wherein said unitary member includes a pawl portion on an outer side of a spool ratchet wheel to engage said programming ratchet means and said sensor arm portion is disposed inwardly of said ratchet wheel to engage the spool stored webbing.

* * * * *